US011819877B2

(12) United States Patent
Fedurco et al.

(10) Patent No.: US 11,819,877 B2
(45) Date of Patent: Nov. 21, 2023

(54) METHOD FOR DEPOSITING AN ADHESIVE METAL COATING WHICH IS HYDROPHOBIC AND ELECTRICALLY CONDUCTIVE

(71) Applicant: COMPAGNIE GENERALE DES ETABLISSEMENTS MICHELIN, Clermont-Ferrand (FR)

(72) Inventors: Milan Fedurco, Clermont-Ferrand (FR); Antonio Delfino, Clermont-Ferrand (FR); David Olsommer, Clermont-Ferrand (FR)

(73) Assignee: COMPAGNIE GENERALE DES ETABLISSEMENTS MICHELIN, Clermont Ferrand (FR)

( * ) Notice: Subject to any disclaimer, the term of this patent is extended or adjusted under 35 U.S.C. 154(b) by 1318 days.

(21) Appl. No.: 16/319,049

(22) PCT Filed: Jul. 19, 2017

(86) PCT No.: PCT/FR2017/051965
§ 371 (c)(1),
(2) Date: Jan. 18, 2019

(87) PCT Pub. No.: WO2018/015658
PCT Pub. Date: Jan. 25, 2018

(65) Prior Publication Data
US 2021/0354169 A1 Nov. 18, 2021

(30) Foreign Application Priority Data

Jul. 19, 2016 (FR) .................................... 1656877

(51) Int. Cl.
*H01M 4/02* (2006.01)
*B05D 1/02* (2006.01)
*C09D 7/20* (2018.01)
*C09D 5/24* (2006.01)
*C09D 127/16* (2006.01)
*C09D 163/10* (2006.01)
*H01M 8/0206* (2016.01)
*H01M 8/0221* (2016.01)
*H01M 8/0228* (2016.01)
*C08K 3/04* (2006.01)
*H01M 8/10* (2016.01)

(52) U.S. Cl.
CPC ................ *B05D 1/02* (2013.01); *C09D 5/24* (2013.01); *C09D 7/20* (2018.01); *C09D 127/16* (2013.01); *C09D 163/10* (2013.01); *H01M 8/0206* (2013.01); *H01M 8/0221* (2013.01); *H01M 8/0228* (2013.01); *B05D 2202/15* (2013.01); *B05D 2504/00* (2013.01); *B05D 2506/10* (2013.01); *C08K 3/042* (2017.05); *C08K 2201/001* (2013.01); *C08K 2201/005* (2013.01); *H01M 2008/1095* (2013.01)

(58) Field of Classification Search
CPC ....................................................... H01M 4/02
See application file for complete search history.

(56) References Cited

U.S. PATENT DOCUMENTS

| 4,111,894 | A | 9/1978 | Gergen et al. |
| 4,690,836 | A | 9/1987 | Clarke et al. |
| 4,696,764 | A | 9/1987 | Yamazaki |
| 4,888,450 | A | 12/1989 | Lando et al. |
| 6,248,467 | B1 | 6/2001 | Wilson et al. |
| 6,299,801 | B1 | 10/2001 | Handa et al. |
| 6,372,376 | B1 | 4/2002 | Fronk et al. |
| 6,379,476 | B1 | 4/2002 | Tarutani et al. |
| 6,537,359 | B1 | 3/2003 | Spa |
| 6,864,007 | B1 | 3/2005 | Iqbal et al. |
| 7,365,121 | B2 | 4/2008 | Huang et al. |
| 7,910,262 | B2 | 3/2011 | Akikusa et al. |
| 9,515,324 | B2 | 12/2016 | Suzuki et al. |

(Continued)

FOREIGN PATENT DOCUMENTS

| CN | 102086338 A | 6/2011 |
| EP | 2 884 570 A1 | 6/2015 |

(Continued)

OTHER PUBLICATIONS

McKeen, "Effect of Temperature and Other Factors on Plastics and Elastomers", 2008, 2nd Ed., p. 1 (2008).
C. Turan et al., "Effect of manufacturing processes on contact resistance characteristics of metallic bipolar plates in PEM fuel cells", Int'l J. Hydrogen Energy 36 (2011) 12370-12380.
International Search Report dated Oct. 9, 2017, in corresponding PCT/FR2017/051965 (6 pages).
V. Delhorbe, et al., "Fluorohexane network and sulfonated PEEK based semi-IPNs for fuel cell membranes", Journal of Membrane Science, vol. 389, pp. 57-66 (2012).

(Continued)

*Primary Examiner* — Scott J. Chmielecki
(74) *Attorney, Agent, or Firm* — VENABLE LLP

(57) ABSTRACT

A process for depositing a metal-adhesive, hydrophobic and electrically conductive coating based on electrically conductive microparticles and on a polymer matrix P comprising at least one thermoplastic fluoropolymer P1 and a thermosetting resin P2, comprises: in a first container, dissolve the polymer P1 in an organic solvent; in a second container, disperse the electrically conductive microparticles in an organic solvent; add, in the first container, the thermosetting resin P2 in the liquid state; mix the contents of the containers, then deposit the mixture on the substrate; crosslink the resin P2 and remove the solvents, to obtain a first coating; then impregnate the surface of the substrate with an additional resin solution P2 dissolved in a third solvent, which is a solvent of the resin P2 and a non-solvent of the polymer P1; eliminate the third solvent and crosslink while compressing the additional resin P2 in order to obtain the targeted final coating.

43 Claims, No Drawings

(56) References Cited

U.S. PATENT DOCUMENTS

| | | |
|---|---|---|
| 10,002,719 B2 | 6/2018 | Ha et al. |
| 2001/0021547 A1 | 9/2001 | Sakairi |
| 2002/0136941 A1 | 9/2002 | Bonnet et al. |
| 2002/0177027 A1 | 11/2002 | Yeager et al. |
| 2004/0211943 A1 | 10/2004 | Okahara et al. |
| 2005/0244700 A1 | 11/2005 | Abd Elhamid et al. |
| 2006/0046125 A1 | 3/2006 | Lai |
| 2006/0240305 A1 | 10/2006 | Huang |
| 2006/0267235 A1 | 11/2006 | Ma et al. |
| 2008/0185559 A1 | 8/2008 | Yoon et al. |
| 2008/0299419 A1 | 12/2008 | Zhamu et al. |
| 2009/0317710 A1 | 12/2009 | Douglas et al. |
| 2010/0263533 A1 | 10/2010 | Gadkaree et al. |
| 2011/0186340 A1 | 8/2011 | Kuramoto et al. |
| 2012/0132274 A1* | 5/2012 | Kleine Jaeger ...... H05K 3/1208 438/677 |
| 2013/0295432 A1 | 11/2013 | Inoue |
| 2014/0370382 A1 | 12/2014 | Lim |
| 2015/0140204 A1 | 5/2015 | Suzuki et al. |
| 2016/0096975 A1 | 4/2016 | Saito et al. |
| 2016/0318342 A1 | 11/2016 | Delfino |
| 2016/0322661 A1 | 11/2016 | Guimet et al. |
| 2017/0050468 A1 | 2/2017 | Delfino |
| 2018/0009264 A1 | 1/2018 | Delfino |
| 2018/0355207 A1 | 12/2018 | Fedurco et al. |
| 2018/0358631 A1 | 12/2018 | Fedurco et al. |

FOREIGN PATENT DOCUMENTS

| | | |
|---|---|---|
| WO | 02/13300 A1 | 2/2002 |
| WO | 2005/006472 A1 | 1/2005 |
| WO | 2015/107276 A1 | 7/2015 |

OTHER PUBLICATIONS

L. Chikh, et al., "(Semi-)Interpenetrating polymer networks as fuel cell membranes", Journal of Membrane Science, vol. 368, pp. 1-17 (2011).

* cited by examiner

METHOD FOR DEPOSITING AN ADHESIVE METAL COATING WHICH IS HYDROPHOBIC AND ELECTRICALLY CONDUCTIVE

1. FIELD OF THE INVENTION

The field of the present invention is that of solid compositions of use especially as metal-adhesive, hydrophobic and electrically conductive coating.

It relates more particularly to the processes for the deposition of such compositions, sometimes also termed "paints", on at least partially metallic substrates, in particular on steel bipolar plates for fuel cells with ion-exchange polymer membranes, referred to as "PEMs" (for proton exchange membranes).

2. PRIOR ART

It will be recalled first of all that a PEM fuel cell is composed of a stack of individual electrochemical cells electrically connected in series and which each develop a certain voltage, in general of between 0.3 and 1.1 volts. The total voltage developed by the cell is therefore equal to the sum of the individual voltages, for example around a few hundred volts for fuel cells targeting applications in the transport field.

Each individual electrochemical cell is usually composed of the superposition of five layers: a polymer film, one zone of which forms an ion-exchange membrane, two electrodes comprising chemical elements necessary for the development of the electrochemical reaction, such as for example platinum, and two gas diffusion layers (GDLs) that make it possible to ensure a homogeneous diffusion of the gases used over the whole of the surface of the ion-exchange membrane.

The supply of the gases is ensured by plates that are generally referred to as "bipolar plates" as they are in contact with the anode of one cell and with the cathode of the adjacent cell.

These bipolar plates perform two very different functions. It is known that it is necessary to supply the cell with fuel gas and oxidant gas, that is to say with hydrogen and with air or with pure oxygen, and that it is also necessary to cool same, that is to say to pass a coolant fluid such as water through it. One of the functions of the bipolar plates is to enable these various fluids, required for the operation of the fuel cell, to be conveyed. Moreover, the bipolar plates also perform an electrical function: ensuring electrical conduction between the anode and the cathode of each of the adjacent electrochemical cells.

These different functions, conveying fluids and conducting electricity, provide the specifications which the materials used for producing these bipolar plates must meet. The materials used must have a very high electrical conductivity, they must also be leaktight against the fluids used and demonstrate very high chemical stability with regard to these fluids.

In addition, the bipolar plates must have sufficient mechanical characteristics to allow the superposition of a large number of individual electrochemical cells and associated bipolar plates and the holding together of the assembly by compression between end plates using tie bars. They must therefore have sufficient mechanical characteristics to withstand this compression.

Graphite is commonly used, since this material both offers high electrical conductivity and is chemically inert to the fluids used. By way of example, patent application WO 2005/006472 shows a possible embodiment of such bipolar plates. It is seen that they are composed of the superposition of two relatively rigid graphite plates, with the interposition of a relatively flexible sheet produced from graphite material, in order to adapt to the thickness tolerances of the different layers. The graphite plates comprise the networks of channels that are necessary for the distribution of the fuel gases and oxidizing gas, and the network of channels allowing each bipolar plate to be passed through by a coolant fluid such as water. Unfortunately, the rigid elements involved in the construction of the graphite bipolar plates are fairly fragile to impacts, in particular during handling when assembling the cell. The layer made of flexible graphite material, referred to previously, is also most particularly difficult to handle on an industrial scale. This all significantly detrimentally effects the costs of manufacturing such bipolar plates.

Steel bipolar plates, especially made of stainless steel or covered with stainless steel, are also known for this type of application. While they are certainly much more mechanically robust than graphite plates, they must nonetheless be covered with protective coverings, protecting the metal from corrosion, capable of adhering to the metal while affording sufficient electrical conductivity, which makes the formulation of such coatings, and also the processes for depositing them, particularly complex to develop.

Such bipolar plates and/or the protective coatings thereof and/or processes for depositing such coatings have for example been described in the patent documents U.S. Pat. Nos. 6,372,376, 6,379,476, 6,537,359, 7,365,121, 7,910,262, WO 02/13300.

The aim of the present invention is to propose a novel deposition process which makes it possible to obtain a protective coating for a bipolar plate that meets the requirements described above, while advantageously affording this coating not only suppleness and flexibility but also particularly advantageous self-sealing properties.

3. BRIEF DESCRIPTION OF THE INVENTION

Thus, according to a first subject, the present invention relates to a process for depositing, on a substrate, at least the surface of which is at least partially metallic, a metal-adhesive, hydrophobic and electrically conductive coating, said coating being based on electrically conductive microparticles and on a polymer matrix P comprising at least one thermoplastic fluoropolymer P1 and a thermosetting resin P2, said process comprising at least the following steps:
- in a first container, dissolve the polymer P1 in an organic solvent, referred to as first solvent, of this polymer;
- in a second container, disperse the electrically conductive microparticles in an organic solvent of the polymer P1, referred to as second solvent, identical to or different from the first solvent;
- add, in the first container, the thermosetting resin P2 in the liquid state;
- mix the contents of the first and second containers, then deposit the mixture obtained in this way on the substrate;
- crosslink the resin P2 and remove the solvents, in order to obtain a first coating, referred to as intermediate coating, on the substrate;
- then impregnate the surface of the substrate coated in this way with an additional resin solution P2 dissolved in a solvent, referred to as third solvent, which is a solvent of the resin P2 and a non-solvent of the polymer P1;

eliminate the third solvent and crosslink while compressing the additional resin P2 in order to obtain the targeted final coating on the substrate.

This process of the invention is advantageously implemented for the deposition of such a coating on a fuel cell bipolar plate made of steel, in particular of stainless steel.

The invention also relates to any substrate, at least the surface of which is at least partially metallic and coated with a coating that adheres to the metal, is hydrophobic and is electrically conductive, able to be obtained by the process of the invention, in particular any fuel cell bipolar plate made of steel, in particular of stainless steel.

The invention and its advantages will be easily understood in the light of the detailed description and exemplary embodiments which follow.

4. DETAILED DESCRIPTION OF THE INVENTION

Unless expressly indicated otherwise, all the percentages (%) indicated in the present application are percentages by weight (or by mass, in an equivalent manner).

The expression "x and/or y" means "x" or "y" or both (i.e. "x and y"). Any range of values denoted by the expression "between a and b" represents the field of values ranging from more than "a" to less than "b" (that is to say limits "a" and "b" excluded), whereas any range of values denoted by the expression "from a to b" means the field of values ranging from "a" up to "b" (that is to say including the strict limits "a" and "b").

A first subject of the present invention is therefore a process for depositing, on a substrate, at least the surface of which is at least partially metallic, a metal-adhesive, hydrophobic (anti-corrosion) and electrically conductive coating, this coating (by definition, therefore, solid) being based on electrically conductive microparticles and on a polymer matrix P comprising at least one thermoplastic fluoropolymer P1 and a thermosetting resin (or resin composition) P2, said process comprising at least the following steps:

in a first container, dissolve the polymer P1 in an organic solvent, referred to as first solvent, of this polymer;

in a second container, disperse the electrically conductive microparticles in an organic solvent of the polymer P1, referred to as second solvent, identical to or different from the first solvent;

add, in the first container, the thermosetting resin P2 in the liquid state;

mix the contents of the first and second containers, then deposit the mixture (suspension) obtained in this way on the substrate;

crosslink the resin P2 and remove the solvents, in order to obtain a first coating, referred to as intermediate coating, on the substrate;

then impregnate the surface of the substrate coated in this way with an additional resin solution P2 dissolved in a solvent, referred to as third solvent, which is a solvent of the resin P2 and a non-solvent of the polymer P1;

eliminate the third solvent and crosslink while compressing the additional resin P2 in order to obtain the targeted final coating on the substrate.

Preferentially, the polymer P1 comprises at least one homopolymer or one copolymer of vinylidene fluoride (abbreviated to PVDF), that is to say consists at least in part (i.e. partially or entirely) of such a polymer. This type of polymer is well known and commercially available, generally in powder or pellet form, for example from Solvay under the trade name Solef. It is especially a customary binder known for bipolar plates not made of metal but made of graphite.

Preferably, the weight-average molecular weight, Mw, of this polymer P1, is between 100 000 and 1 000 000 g/mol, more preferentially in a range from 200 000 to 8 000 000 g/mol.

Preferably, the polymer P1 has a glass transition temperature (Tg) of less than 50° C., more preferentially less than 0° C. According to another preferential embodiment, whether or not combined with the preceding embodiment, it has a melting point (M.p.) of less than 250° C., more preferentially less than 200° C.

The first solvent, by definition the organic solvent of the thermoplastic fluoropolymer P1, is preferably selected from the group consisting of tetrahydrofuran (THF), methyl ethyl ketone (MEK), dimethylformamide (DMF), dimethylacetamide (DMA), dimethyl sulfoxide (DMSO), tetramethyl urea (TMU), N-methyl-2-pyrrolidone (NMP), N-ethyl-2-pyrrolidone (NEP), trimethyl phosphate and mixtures of such solvents; more preferentially, this solvent is NMP.

The electrically conductive microparticles may be organic or inorganic, for example metallic. By way of examples of such metallic microparticles, mention may be made of nickel particles, or else particles of nitrides of metals such as nickel, aluminium or titanium.

These microparticles preferably have a weight-average size which is between 1 μm and 100 μm, more preferentially between 1 and 50 μm, in particular between 2 and 25 μm.

"Size" is intended to mean here the diameter in the case of spherical particles, for example in powder form, or the length (or longest dimension) in the case of anisometric particles, for example in the form of rods or platelets.

Various known methods are applicable for the analysis of the particle size and the calculation of the mean size of the microparticles (or mean diameter for microparticles assumed to be substantially spherical), for example by laser diffraction (see, for example, Standard ISO 8130-13).

Use may also simply and preferentially be made of an analysis of the particle size by mechanical sieving; the operation consists in sieving a defined amount of sample (for example 200 g) on a vibrating table for 30 min with different sieve diameters (for example, according to a progressive ratio equal to 1.26, with meshes of 500, 400, . . . 100, 80, 63 μm, etc.); the oversize collected on each sieve is weighed on a precision balance; the % of oversize for each mesh diameter relative to the total weight of product is deduced therefrom; the median size (or median diameter) is finally calculated in a known way from the histogram of the particle size distribution.

These electrically conductive microparticles preferentially comprise at least graphite microparticles, that is to say consist at least in part (i.e. partially or entirely) of graphite. The latter may be in powder and/or lamellar form, for example in the form of exfoliated graphite, preferably of weight-average size of between 2 and 15 μm and of thickness between 50 and 150 nm (nanometres).

According to the invention, the electrically conductive microparticles are therefore dispersion, that is to say suspended, in a second container. For this dispersion, an organic solvent of the polymer P1, referred to as second solvent, is used, which may be identical to or different from the first solvent. Advantageously, first and second solvents are identical.

Generally speaking, "resin" or "thermoset resin" P2 is intended to mean, in the present application, the (at least one) resin itself and any composition based on this resin (or mixture of resins) and comprising at least one additive (that is to say one or more) additive(s), a peroxide crosslinking system for example. This resin, in the solid final coating, is of course crosslinked (thermoset), in other words is in the form of a network of three-dimensional bonds, in a state specific to "thermosetting" polymers (as opposed to "thermoplastic" polymers).

The thermosetting resin (starting product) used is generally liquid at 20° C.; it is preferentially used with a solvent, in particular styrene, in order to adjust the viscosity thereof according to the particular conditions of use of the invention.

The term "liquid" in the present application describes any substance which, at room temperature (20° C.) and under atmospheric pressure, is in the liquid state, that is to say has the ability to eventually, i.e. to give a concrete idea, in less than one hour, assume the shape of its container; in contrast, any substance not meeting this criterion is considered to be "solid" (at 20° C.).

This is, by definition, a crosslinkable (i.e. curable) resin able to be crosslinked or cured by any known method, for example by radiation or heat treatment, generally in the presence of a polymerization initiation system such as a photoinitiator or a thermoinitiator. Use is preferably made of a thermal-type initiator, more preferentially an organic peroxide such as a peroxyester, by way of example a methyl ethyl ketone peroxide (MEKP), a cumene hydroperoxide (CHP) or else a mixture of both at different ratios, with which initiator a crosslinking accelerator, for example of aniline type (e.g. dimethylaniline or DMA), or a crosslinking promoter, for example a cobalt compound (e.g. cobalt naphthenate), may be combined.

Preferably, the resin P2 comprises at least one vinyl ester resin, in particular of epoxy vinyl ester type, that is to say consists at least in part (i.e. partially or entirely) of such a vinyl ester resin. Use is more particularly made of an epoxy vinyl ester resin which, at least in part, is based on (i.e. grafted onto a structure of this type) novolac (also known as phenoplast) and/or bisphenol, in other words preferentially a vinyl ester resin based on novolac, bisphenol, or novolac and bisphenol, more preferentially still a vinyl ester resin of bisphenol epoxy type.

An epoxy vinyl ester resin based on novolac (the part between brackets in formula I below) corresponds for example, in a known way, to the following formula (I):

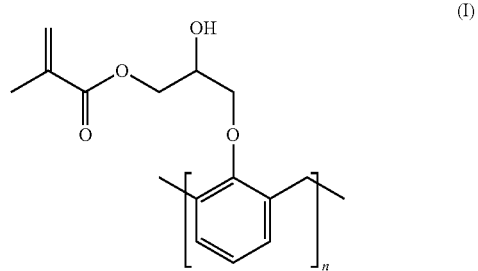

An epoxy vinyl ester resin based on bisphenol A (the part between brackets in formula (II) below) corresponds for example to the formula (the "A" serving as a reminder that the product is manufactured using acetone):

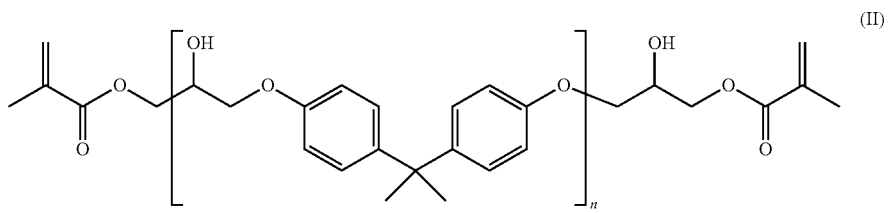

An epoxy vinyl ester resin of bisphenol type has shown excellent results; by way of examples of such a resin, mention may especially be made of the resins of the DION 9100 series, sold by Reichhold (containing approximately 45% of styrene), for various applications, in particular for the manufacture of laminated composites based on glass fibres.

Preferentially, the resin P2 has, in the final crosslinked, thermoset state, a glass transition temperature Tg which is between 30° C. and 150° C., more preferentially between 80° C. and 150° C., in particular between 90° C. and 130° C.

The resin (or resin composition) P2 is therefore added to the first container in the liquid state, such as or preferably in a suitable solvent, more preferentially in styrene; the solvent advantageously makes it possible, according to particular embodiments of the invention, to adjust the viscosity of the resin, and therefore that of the final paint in the suspension state, for optimal application of same before its subsequent crosslinking.

After mixing the contents of the first and second containers, the final mixture obtained (suspension) may be deposited on the metallic substrate according to various general methods to well known to those skilled in the art, for example by applying by means of a brush, by submerging in a bath, or else by spraying.

At this stage, the solvents used beforehand may be eliminated by any method known to those skilled in the art, simple drying, placing under vacuum or under a gas stream. This may be carried out prior, or concomitantly, to the crosslinking of the resin P2.

The crosslinking of the resin P2 during the obtaining of the intermediate coating on the substrate, and therefore the solidification of said intermediate coating, may be carried out by any suitable method. It is preferably carried out by heating, typically to a temperature greater than 100° C., which makes it possible to remove the solvent(s) used at the same time as the crosslinking occurs. Said crosslinking is preferably performed in the presence of a polymerisation thermoinitiator system in the resin P2, for example a peroxide compound.

After obtaining the intermediate coating, the surface of the substrate coated in this way (in other words, of course, the solid intermediate coating itself) is impregnated with an additional solution (therefore by definition liquid) of thermosetting resin (or resin composition) P2 which is dissolved in a solvent, referred to as third solvent, which is both a solvent of the resin P2 and a non-solvent of the polymer P1. Preferably, the third solvent is acetone.

This additional impregnation step of the intermediate coating may be carried out by any known technique such as, for example, dipping, immersion or else spraying.

The third solvent is then eliminated and the additional resin P2 is crosslinked while compressing it in order to obtain the targeted final (solid) coating on the substrate.

As described above, the third solvent may be eliminated or evaporated by any known method, drying, placing under vacuum or under a gas stream. This may be carried out prior, or concomitantly, to the crosslinking of the resin P2.

Preferably, the final step of crosslinking the additional resin P2 is carried out by heat treatment in a pressurized mould. Thus, the third solvent (all of it, or a residual portion), assuming it has not already been eliminated beforehand, will be eliminated by evaporation at high temperature.

The temperature of the heat treatment and crosslinking in the mould is preferably greater than 150° C., more preferentially between 150° C. and 200° C. Advantageously, this heat treatment temperature will be chosen to be greater than the glass transition temperature of the resin P2 and less than the melting point of the polymer P1.

The pressure in the mould is preferentially greater than 10 bar, more preferentially between 10 and 100 bar.

By virtue of its preferred specific Tg range, the resin P2 is able to confer upon the solid final coating not only suppleness and flexibility but also improved self-sealing properties by virtue of a high level of deformability, which constitutes a noteworthy advantage for anti-corrosion applications, in particular for an application in paint for fuel cell bipolar plates. It also limits the permeability of this coating or of this paint at high temperature.

By virtue of providing the additional resin P2 and final crosslinking under pressure, after the first intermediate coating, it has also been observed that the properties of electrical conductivity, hydrophobicity (anti-corrosion) and self-sealing were further improved.

This process in accordance with the invention preferably has at least one of the following verified characteristics, more preferentially all of the following verified characteristics:

- the overall content of polymer matrix P (i.e. P1 plus P2, both solid) represents 5% to 25%, more preferentially 5% to 20% by weight of the solid final coating;
- the content of electrically conductive microparticles represents 75% to 95%, more preferentially 80 to 95% by weight of this solid final coating;
- the content (% by weight) of polymer P1 in the solid final coating is between 1% and 15%, more preferentially between 2 and 10%;
- the content of resin P2 (solid) is, for its part, preferentially between 2% and 15%, more preferentially 2 and 12%;
- the P2/P1 weight ratio is between 0.2 and 5, more preferentially between 0.4 and 2.5.

The melting point (M.p.) and glass transition temperature (Tg) indicated above are measured in a known manner by DSC (Differential Scanning calorimetry), at the second pass, for example, and unless otherwise indicated in the present application, according to standard ASTM D3418 of 1999 (822-2 DSC apparatus from Mettler Toledo; nitrogen atmosphere; samples first brought (10° C./min) from −80° C. to the maximum targeted temperature (for example 200° C.), then rapidly cooled (in 10 min) down to −80° C., before final recording of the DSC curve from −80° C. to the maximum targeted temperature (for example 200° C.), at a ramp of 10° C./min.

The weight-average molecular weight (Mw) is measured by SEC (Size Exclusion Chromatography). As a reminder, this technique makes it possible to separate macromolecules in solution according to their size through columns filled with a porous gel. The macromolecules are separated according to their hydrodynamic volume, the bulkiest being eluted first.

SEC is coupled to a refractometer; it gives, in this case, relative information. Starting from commercial standard products, the various number-average molar masses (Mn) and weight-average molar masses (Mw) that characterize the distribution of the molar masses of the polymer may be determined and the polydispersity index (PI=Mw/Mn) calculated via a Moore calibration. There is no specific treatment of the polymer sample before analysis. The latter is simply dissolved in the elution solvent at a concentration of approximately 1 g/l. The solution is then filtered through a filter with a porosity of 0.45 μm before injection. The apparatus used is a Waters Alliance chromatographic line. The elution solvent is DMAC (dimethylacetamide), the flow rate is 0.7 ml/min, the temperature of the system is 50° C. and the analysis time is 90 min. A set of four Waters columns (1 Styragel HMW7 column+1 Styragel HMW6E column+2 Styragel HT6E columns) is used. The volume of the solution of polymer sample injected is 100 The detector is a Waters 2414 differential refractometer and the software for making use of the chromatographic data is the Waters Empower system. The calculated average molar masses are relative to a calibration curve produced from PSS Ready Cal-Kit commercial polystyrene standards.

The final coating obtained according to the process of the invention described above may optionally comprise various additives, known especially to form part of the formulation of coatings or paints for fuel cell bipolar plates, for example adhesion promoters or anti-corrosion agents.

The process of the invention may be implemented on any type of substrate, at least the surface of which is at least partially metallic.

The process of the invention is most particularly implemented for the deposition of a paint on a fuel cell bipolar plate, this plate being for example made of steel, more preferentially made of stainless steel optionally coated with a thin metallic layer (thus intermediate layer) made of another metal such as, for example, nickel, as is explained in more detail in the following exemplary embodiments.

The thickness of the final solid coating on such a bipolar plate is preferably between 10 and 60 µm, more preferentially between 15 and 50 µm. When the stainless steel is covered beforehand with an intermediate layer made of another metal, for example nickel, this intermediate layer has a thickness preferably of between 2 and 20 µm, more preferentially in a range from 5 to 15 µm.

5. EXEMPLARY EMBODIMENTS OF THE INVENTION

In the following examples, the deposition, in accordance with the process of the invention, of a paint on a PEM fuel cell bipolar plate is described.

Stainless steel plates (316 L steel) with dimensions 25×25 cm, were coated beforehand with a thin intermediate layer of nickel electrolytically, as is known, with a thickness equal to approximately 10 µm. The paint was then deposited according to the process described above, by successively applying the following detailed steps.

a) Preparation of a Solution of PVDF (at 5% in NMP)

10 g of PVDF in powder form (Solef 5320 from Solvay, Mw equal to approximately 530 000; Tg equal to approximately −40° C.; M.p. equal to approximately 160° C.) then 200 ml of anhydrous NMP (Biotech grade, Sigma-Aldrich) were added in a first container (100 ml brown-tinted bottle fitted with a lid). Everything was stirred (mechanical stirrer, overnight) until the PVDF was entirely dissolved.

b) Preparation of a Suspension of the Conductive Microparticles (Conductive Mixture)

In a second container (250 ml glass bottle fitted with a lid), 12.5 g of graphite powder (M850 from Asbury Carbons), of a mean size equal to approximately 5 µm, and 6.25 g of expanded graphite in lamellar form (MX15 from Timcal, Switzerland), of a mean size equal to approximately 17 µm, were dispersed in 50 ml of NMP, with everything being stirred overnight. 6.25 g of nickel particles (mean size 3 µm; Sigma-Aldrich product no. 266981, 99.7% purity) were then added to this graphite suspension, to obtain a composition having the appearance of a semi-solid paste, everything being stirred (without magnetic stirrer bar) for 5 min before introducing the mixture of polymers prepared in the following step c).

c) Preparation of the Liquid PVDF/Vinyl Ester Solution (Polymer Mixture)

2.1 g of vinyl ester resin (Dion 9100 from Reichhold, Germany, containing 45% styrene; Tg equal to approximately 105° C.) were then added to 60.2 g of 5% PVDF solution prepared in step a) in the first 100 ml container, everything being stirred (magnetic stirrer bar) for 5 min. Finally, 0.2 ml of CHP thermoinitiator with cobalt promoter (Trigonox 239 from Akzo Nobel, 45% solution) was added and the resulting solution (polymer mixture) was stirred for 2 min.

d) Addition of the Polymer Mixture to the Conductive Mixture

Finally, the polymer solution prepared in step c) above was carefully poured (final rinsing of the first container with 15 ml of NMP solvent) into the second container containing the suspension of microparticles. The second container was closed and stirred for 5 min (without magnetic stirrer bar).

At this stage, the final mixture or paint in the suspension state had the following composition (% by weight): 12.5 g of M850 (41.51%), 6.25 g of MX15 (20.76%), 6.25 g of Ni (20.76%), 2.1 g of Dion 9100 (6.98%) and 3.01 g of PVDF Solef 5320 (10%), everything giving 30.11 g (100%) of solid.

e) Deposition of the Paint on Bipolar Plate for Intermediate Coating

Samples of the paint prepared in this way were sprayed onto bipolar plates by means of a pneumatic spraygun (Air Gupsa AZ3 HTE2 from Anest Iwate Group, Italy) using compressed nitrogen (2.5 bar) as carrier gas. The plates were arranged vertically in an oven preheated to 120° C., then they were heat treated at this temperature for 60 min. Once the treatment had ended, and the plates had cooled to room temperature (20° C.), the mean (over 5 measurements) thickness of the paint (intermediate coating) deposited in this way in the solid state (with all solvent removed) was equal to approximately 30 µm.

f) Impregnation and Treatment for Final Coating

The bipolar plates coated in this way were then impregnated by two successive immersions of 30 seconds in a solution of 400 ml of acetone as third solvent, containing 24 g of vinyl ester resin (Dion 9100) and peroxide (2.4 ml of Trigonox 239). The plates were then dried in air after treatment, and were subsequently pressed in a mould at 160° C. for 1 hour under a pressure of approximately 65 bar. The plates coated in this way with their final coating were left to cool to room temperature. The mean final paint thickness (over 5 measurements) obtained was equal to approximately 30 µm.

g) Electrical Conductivity Measurements (ICR Tests)

Each bipolar plate, coated in this way with its final coating, was then arranged "sandwiched" between two fuel cell GDL layers (TGP-H-60 from Torray), themselves arranged between two gold-plated copper electrodes (each with a working contact surface area of 10 cm$^2$) supplied by a measurement apparatus (AOIP OM 156 type micro ohmmeter) injecting a current of 1 A into the circuit between the two electrodes.

The electrical conductivity was characterized by calculating what is referred to as the interfacial contact resistance or ICR (in mΩ·cm$^2$) between plate and GDL as a function of the contact pressure (50 to 200 N/cm$^2$) applied over the whole of the plate/GDL/electrodes device during the measurement. Such a method is well known and has been described in numerous publications, for example in "Effect of manufacturing processes on contact resistance characteristics of metallic bipolar plates in PEM fuel cells", International Journal of Hydrogen Energy 36 (2011), 12370-12380 (see especially paragraph 2.3), or else in patent application WO 02/13300 (see especially FIGS. 1 and 2).

The results obtained (see table below) are excellent for those skilled in the art: they have immediately, without particular optimization, proven to be better than those obtained with a commercially available paint (Acheson paint from Henkel, given in brackets) for the same operating conditions.

TABLE

| ICR (mΩ · cm$^2$)/Contact pressure (N/cm$^2$) | | | |
|---|---|---|---|
| 50 N/cm$^2$ | 100 N/cm$^2$ | 150 N/cm$^2$ | 200 N/cm$^2$ |
| 12.9 (20.8) | 9.0 (15.6) | 7.4 (14.6) | 6.1 (13.5) |

It should be noted that even without the final step of deposition of additional resin P2 then crosslinking under pressure of same, the conductivities obtained were excellent (respectively equal to approximately 23, 16, 14 and 12 mΩ·cm², therefore substantially identical to those measured with commercial paint).

In conclusion, the process of the invention makes it possible to deposit a coating with high electrical conductivity, that is improved in comparison with that of known prior solutions, having high properties of adhesion to metal and a strong hydrophobicity, which is a guarantee of very good anti-corrosion properties, this coating also having suppleness and flexibility, and also advantageous self-sealing properties.

The invention claimed is:

1. A process for depositing, on a substrate, at least the surface of which is at least partially metallic, a metal-adhesive, hydrophobic and electrically conductive coating based on electrically conductive microparticles and on a polymer matrix P comprising at least one thermoplastic fluoropolymer P1 and a thermosetting resin P2, said process comprising at least the following steps:
   in a first container, dissolving the thermoplastic fluoropolymer P1 in a first solvent, the first solvent being an organic solvent of the thermoplastic fluoropolymer P1;
   in a second container, dispersing the electrically conductive microparticles in a second solvent, the second solvent being an organic solvent of the thermoplastic fluoropolymer P1 identical to or different from the first solvent;
   adding, in the first container, the thermosetting resin P2 in the liquid state;
   mixing contents of the first and second containers to obtain a mixture;
   then depositing the mixture on the substrate;
   crosslinking the thermosetting resin P2 and removing the first and second solvents to obtain a first coating, the first coating being an intermediate coating, on the substrate;
   impregnating the surface of the substrate with additional thermosetting resin P2 dissolved in a third solvent, the third solvent being a solvent of the thermosetting resin P2 and a non- solvent of the thermoplastic fluoropolymer P1;
   eliminating the third solvent and crosslinking while compressing the additional thermosetting resin P2 to obtain a final coating on the substrate.

2. The process according to claim 1, wherein a content of polymer matrix P is 5% to 25% by weight of the final coating.

3. The process according to claim 2, wherein the content of polymer matrix P is 5 to 20% by weight of the final coating.

4. The process according to claim 1, wherein a content of microparticles is 75% to 95% by weight of the final coating.

5. The process according to claim 4, wherein the content of microparticles is 80% to 95% by weight of the final coating.

6. The process according to claim 1, wherein a weight-average size of the microparticles is between 1 and 100 µm.

7. The process according to claim 6, wherein the weight-average size of the microparticles is between 1 and 50 µm.

8. The process according to claim 7, wherein the weight-average size of the microparticles is between 2 and 25 µm.

9. The process according to claim 1, wherein the microparticles comprise graphite microparticles.

10. The process according to claim 1, wherein the thermoplastic fluoropolymer P1 has a weight-average molecular weight Mw of between 100,000 and 1,000,000 g/mol.

11. The process according to claim 10, wherein the thermoplastic fluoropolymer P1 has a weight-average molecular weight Mw in a range from 200,000 to 800,000 g/mol.

12. The process according to claim 1, wherein the thermoplastic fluoropolymer P1 comprises a homopolymer or a copolymer of vinylidene fluoride.

13. The process according to claim 1, wherein the thermoplastic fluoropolymer P1 has a glass transition temperature of less than 50° C.

14. The process according to claim 13, wherein the thermoplastic fluoropolymer P1 has a glass transition temperature of less than 0° C.

15. The process according to claim 1, wherein the thermoplastic fluoropolymer P1 has a melting point of less than 250° C.

16. The process according to claim 15, wherein the thermoplastic fluoropolymer P1 has a melting point of less than 200° C.

17. The process according to claim 1, wherein a glass transition temperature of the thermosetting resin P2, in the crosslinked state, is between 30° C. and 150° C.

18. The process according to claim 17, wherein the glass transition temperature of the thermosetting resin P2, in the crosslinked state, is between 80° C. and 150° C.

19. The process according to claim 1, wherein the thermosetting resin P2 comprises a vinyl ester resin.

20. The process according to claim 19, wherein the vinyl ester resin is a bisphenol epoxy vinyl ester resin.

21. The process according to claim 1, wherein a P2/P1 weight ratio in the final coating is between 0.2 and 5.

22. The process according to claim 21, wherein the P2/P1 weight ratio in the final coating is between 0.4 and 2.5.

23. The process according to claim 1, wherein a content of thermoplastic fluoropolymer P1 in the final coating is between 1% and 15%.

24. The process according to claim 23, wherein the content of thermoplastic fluoropolymer P1 in the final coating is between 2% and 10%.

25. The process according to claim 1, wherein a content of thermosetting resin P2 in the final coating is between 2% and 15%.

26. The process according to claim 25, wherein the content of thermosetting resin P2 in the final coating is between 5% and 12%.

27. The process according to claim 1, wherein the first solvent and the second solvent are identical.

28. The process according to claim 1, wherein the first solvent is N-methyl-2-pyrrolidone.

29. The process according to claim 1, wherein the third solvent is acetone.

30. The process according to claim 1, wherein the mixture is deposited on the substrate by spraying.

31. The process according to claim 1, wherein the thermosetting resin is crosslinked by heat treatment while obtaining the intermediate coating.

32. The process according to claim 1, wherein crosslinking the additional thermosetting resin P2 is carried out by heat treatment in a pressurized mold.

33. The process according to claim 31, wherein the heat treatment is carried out in the presence of a thermoinitiator in the thermosetting resin P2.

34. The process according to claim 33, wherein the thermoinitiator is a peroxide type thermoinitiator.

35. The process according to claim 32, wherein the heat treatment is carried out in the presence of a thermoinitiator in the thermosetting resin P2.

36. The process according to claim 35, wherein the thermoinitiator is a peroxide type thermoinitiator.

37. The process according to claim 32, wherein the temperature in the mold is greater than 150° C. and the pressure in the mold is greater than 10 bar.

38. The process according to claim 37, wherein the temperature in the mold is between 150° C. and 200° C. and the pressure in the mold is between 10 and 100 bar.

39. The process according to claim 1, wherein the substrate is a fuel cell bipolar plate made of steel.

40. The process according to claim 39, wherein the steel is stainless steel.

41. A substrate, at least the surface of which is at least partially metallic, coated with a hydrophobic and electrically conductive coating that adheres to the metal, obtained by the process according to claim 1.

42. The substrate according to claim 41, wherein the substrate comprises a steel bipolar plate for a fuel cell.

43. The substrate according to claim 42, wherein the substrate comprises a stainless steel bipolar plate for a fuel cell.

\* \* \* \* \*